(12) United States Patent
Humphrey

(10) Patent No.: US 6,200,066 B1
(45) Date of Patent: Mar. 13, 2001

(54) SELF-PROPELLED VIBRATORY GREENSROLLER

(76) Inventor: John L. Humphrey, 327 Willowpointe Dr., St. Charles, MO (US) 63304

( * ) Notice: Subject to any disclaimer, the term of this patent is extended or adjusted under 35 U.S.C. 154(b) by 0 days.

(21) Appl. No.: 09/244,383

(22) Filed: Feb. 4, 1999

Related U.S. Application Data
(60) Provisional application No. 60/074,346, filed on Feb. 5, 1998.

(51) Int. Cl.$^7$ .................................................... E01C 19/24
(52) U.S. Cl. ......................... 404/117; 404/122; 404/131
(58) Field of Search ................................. 404/117, 122, 404/123, 130, 131, 132

(56) References Cited

U.S. PATENT DOCUMENTS

| | | | |
|---|---|---|---|
| 3,605,582 | * 9/1971 | Kaltenegger . | |
| 3,814,533 | * 6/1974 | Buck | 404/133.1 |
| 5,261,213 | 11/1993 | Humphrey | 56/2 |
| 5,337,833 | 8/1994 | Rizzo | 172/520 |
| 5,664,908 | * 9/1997 | Paladeni | 404/103 |

FOREIGN PATENT DOCUMENTS

| | | | |
|---|---|---|---|
| 1132284 | 11/1968 | (GB) | E01C/19/26 |
| 2013148 | 8/1979 | (GB) | E01C/19/28 |

* cited by examiner

Primary Examiner—Eileen D. Lillis
Assistant Examiner—Gary S. Hartmann
(74) Attorney, Agent, or Firm—Grace J. Fishel

(57) ABSTRACT

A self-propelled vibratory greensroller for smoothing a green, improving ball roll distance and striping. The greensroller has a vibratory roller and a power roller mounted in a frame with the vibratory roller in front of and parallel to the power roller. A prime mover mounted on the frame has a gear box with two power-take offs for connection to a first and second power train. The power roller is divided into right and left sections connected with a differential such that the roller sections do not scuff the green. The first power train includes, a centrifugal clutch which starts the vibratory roller into vibration at some preselected engine speed. The second power train includes a variable speed pulley providing infinite ground speed control for the power roller.

10 Claims, 4 Drawing Sheets

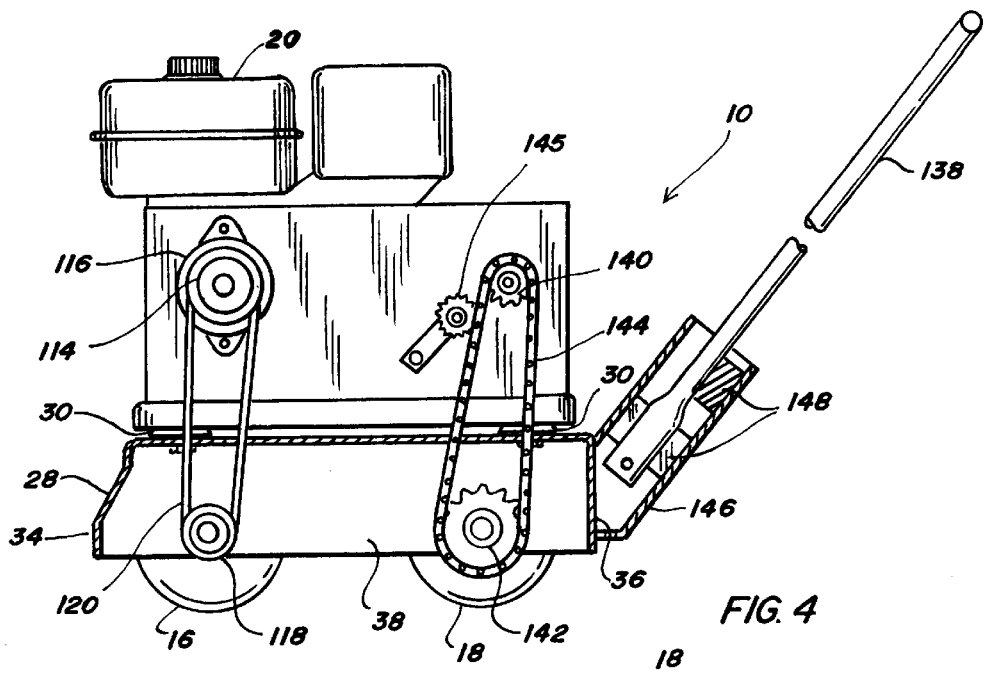

SELF-PROPELLED VIBRATORY GREENSROLLER

This application claims priority from U.S. Provisional patent application Ser. No. 60/074,346, filed Feb. 5, 1998, for Self-Propelled Vibratory Greensroller.

BACKGROUND OF THE INVENTION

1. Field of the Invention

The present invention relates to a self-propelled vibratory greensroller, preferably with an infinite ground speed control, for achieving more consistent ball roll distance at a given ground speed and for producing a checkerboard stripe pattern on greens without mowing.

2. Brief Description of the Prior Art

An objective in the maintenance programs at nearly all well-maintained golf courses is to have consistency among the greens as to ball roll distance. Ball roll distance, otherwise known as "green speed," is an important physical characteristic of putting surfaces and is typically measured with a stimpmeter. By Newtonian physics, the distance a ball rolls is inversely proportional to the coefficient of rolling resistance of the surface. The smoother the green, the farther the roll. Even with similar treatment, however, the green speed on a golf course may vary between greens and it would be desirable to have a machine capable of selectively bringing up the ball roll distance on the slower greens so as to have consistency among the greens. For example, if a stimp reading of 10 is considered ideal on a given course and the ball roll distance on a particular green is 8.5, it would be desirable to selectively roll this green in a way that increases the ball roll distance by 18 inches.

Greens are mowed short to eliminate the grain thereby providing a smooth putting surface and improving green speed. This usually means, however, that the grass is cut below its optimum height and rendered more susceptible to some disease. Every time a mower removes leaf tissue, a wound is created through which a pathogen may enter. Plants produce carbohydrates, which are their source of energy, by photosynthesis carried out in the green plant parts. A low cutting height eliminates the grain of the grass but reduces green plant tissue, decreasing photosynthesis and the available carbohydrates used for plant growth. One way to improve the health of the green is to raise the height of the cut but this makes a rougher putting green and reduces green speed. A lightweight rolling, however, can be used to reduce the grain and smooth the green, allowing for skipped mowing and producing a healthier green.

A checkerboard stripe pattern on greens such as delivered by a walk behind mower is showcased on televised golf events and is highly appealing to players. The pattern is produced with a walk-behind mower by making alternate passes across the green in one direction and making a second set of alternate passes at an angle to the first. In some instances, the putting green is groomed with a checkerboard stripe pattern without mowing the grass by pushing the mower across the green in the above-mentioned pattern, the lawn mower reel laying the grain of the grass in the above-mentioned pattern. This practice, however, does not smooth out ball marks or foot prints, leaving the putting green cratered and susceptible to being scalped when it is mowed. Plainly, it would be desirable to have a piece of equipment that would produce a checkerboard pattern while treating the greens in a manner that provides consistency and allows for taller grass.

A greensroller from a triplex greensmower is described in U.S. Pat. No. 5,261,213. A commercially available unit is sold under the registered trademark TRUE-SURFACE by Turfline, Inc. of St. Charles, Mo. The vibratory roller described in the subject patent can be used to provide consistent putting conditions on most greens and can be used after topdressing, aerification, for tournament preparations or for achieving a true, smooth and consistent putting green. While a greensroller as described in the above-mentioned patent can be used to provide a smooth putting green, it is too wide to make a 22" checkerboard stripe pattern like that left by a standard, walk-behind lawn mower. In addition, the triplex mower may leave wheel tracks in the green and it is also difficult to customize the amount of treatment applied to each green so as to equalize the greens.

BRIEF SUMMARY OF THE INVENTION

In view of the above, it is an object of the present invention to provide a self-propelled greensroller which can be used to selectively increase the ball roll distance on a green. It is another object to provide a self-propelled greensroller which can be used to create a checkerboard pattern in a golf green. It is a further object to improve the health of the golf green by raising the height of the cut, while maintaining a smooth, fast green. Other objects and features of the invention will be in part apparent and in part pointed out hereinafter.

In accordance with the invention, a self-propelled vibratory greensroller for smoothing a green and increasing ball roll distance has a vibratory roller and a power roller mounted in a frame. The vibratory roller is parallel to and positioned forwardly of said power roller in the frame and the frame is supported for movement over the green on the rollers. A prime mover is mounted on the frame above the rollers and is connected to first and second power trains.

The vibratory roller has a transversely extending drum rotatably mounted in bearings in the frame and an unbalanced shaft rotatably driven by the first power train. The unbalanced shaft is rotatably mounted in bearings in the drum whereby the unbalanced shaft applies a centrifugal force which vibrates the drum, smoothing the green and increasing ball roll distance, The power roller has a transversely extending drum rotatably mounted in bearings in the frame and divided into right and left sections. A shaft rotatably driven by the second power train is rotatably mounted in bearings in the drum. The sections are independently rotatable with the shaft through a differential attached to the shaft whereby the sections roll at different speeds or in different directions when the greensroller is turned on the green, minimizing scuffing of the green.

The invention summarized above comprises the constructions hereinafter described, the scope of the invention being indicated by the subjoined claims.

BRIEF DESCRIPTION OF THE SEVERAL VIEWS OF THE DRAWING

In the accompanying drawings, in which several of various possible embodiments of the invention are illustrated, corresponding reference characters refer to corresponding parts throughout the several views of the drawings in which:

FIG. 4 is a sectional view taken along line 4—4 in FIG. 2;

FIG. 5 is a front elevational view, partly in section, of a power roller;

FIG. 6 is a front elevational view, partly in section, of a vibratory roller;

DETAILED DESCRIPTION OF THE INVENTION

Figure 1:
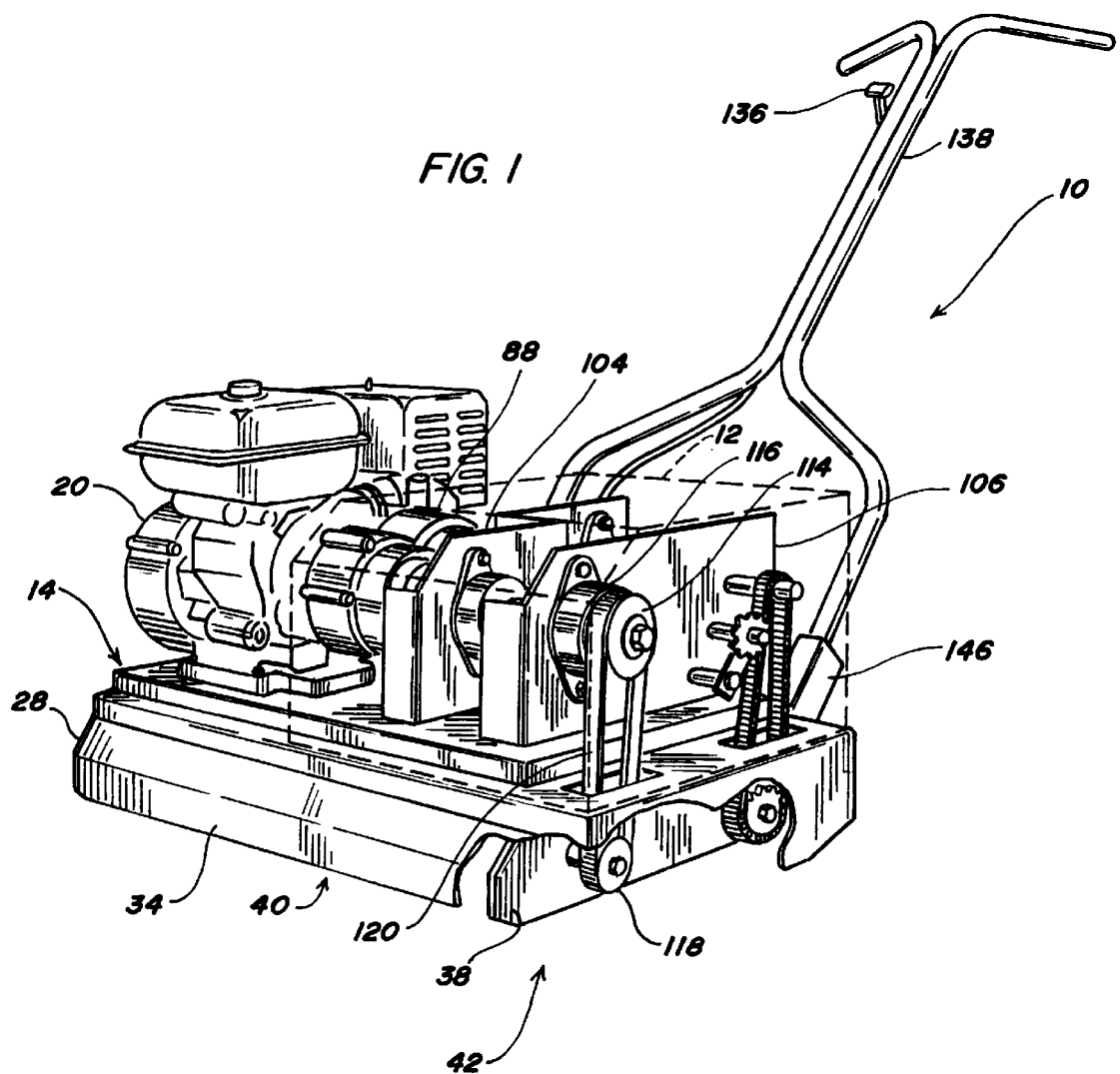
FIG. 1 is a perspective view, with portions of the housing broken away, of a self-propelled greensroller in accordance with the present invention.
Figure 2:
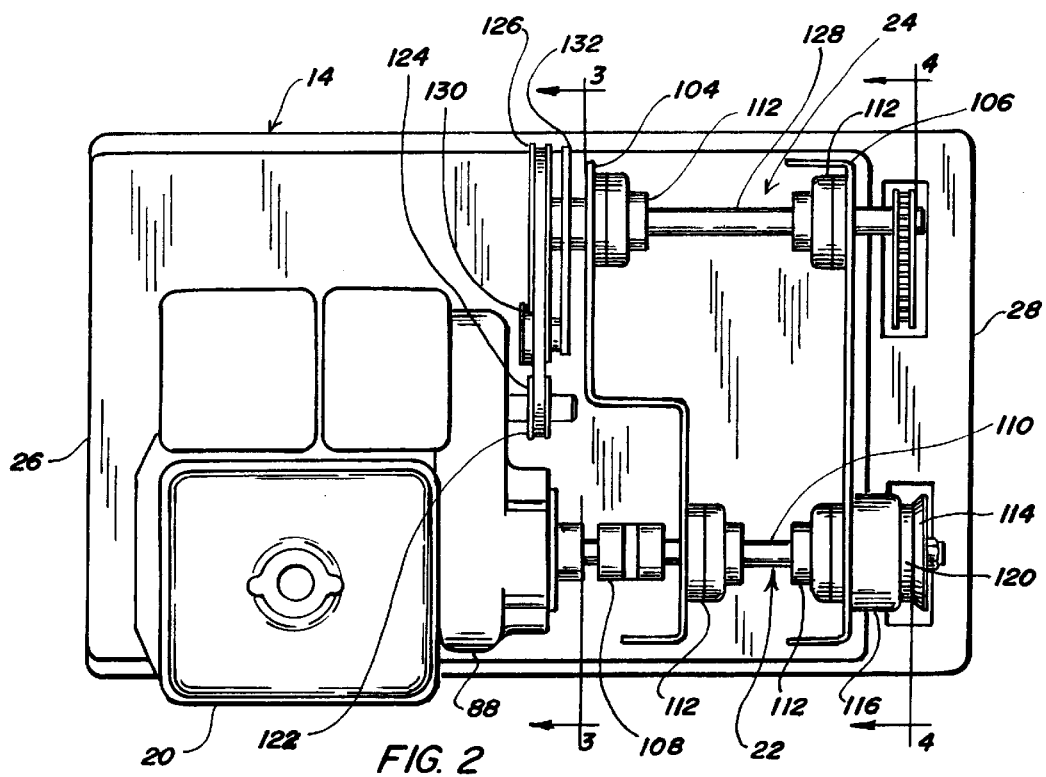
FIG. 2 is a plan view of the greensroller.
Figure 3:
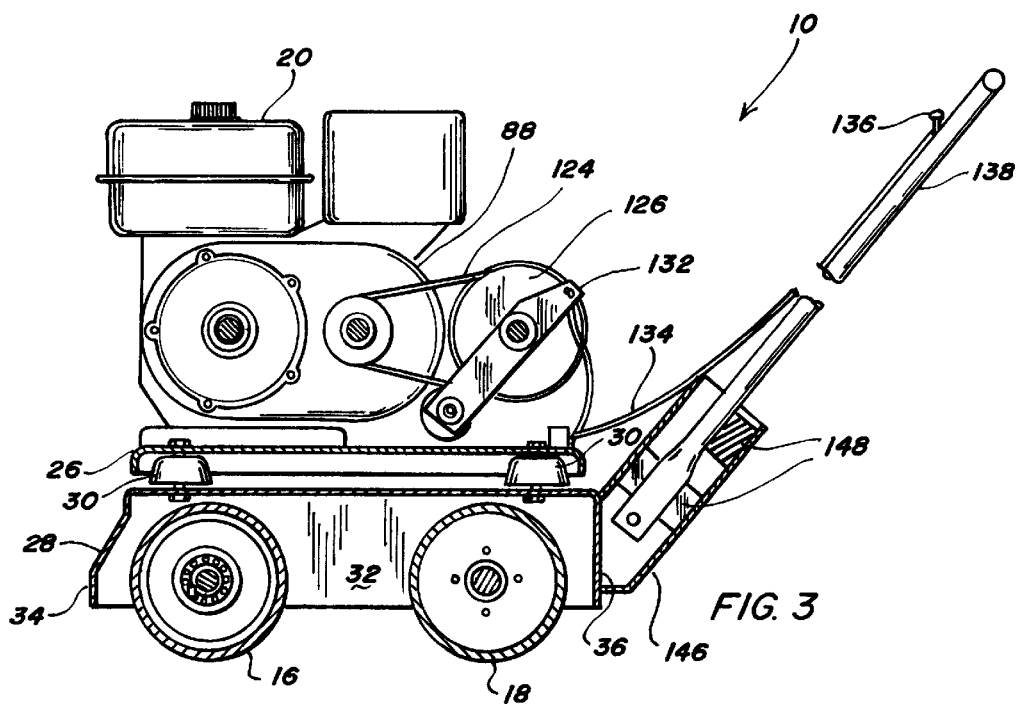
FIG. 3 is a sectional view taken along line 3—3 in FIG. 2.

Referring to the drawings more particularly by reference character, reference numeral 10 refers to a self-propelled vibratory greensroller for smoothing a green in accordance with the present invention. A detachable hood 12 shown in broken lines in FIG. 1 is provided for safety. In major part, greensroller 10 has a frame 14 within which is mounted a vibratory roller 16 and a power roller 18. Vibratory roller 16 is parallel to and positioned forwardly of power roller 18 and frame 14 is supported for movement over the green on rollers 16, 18.

A prime mover 20 with first and second power trains 22, 24, respectively, is mounted on frame 14 above vibratory roller 16 and power roller 18. As shown in FIGS. 1–4, prime mover 20 is a gasoline engine but it could be an electric motor or the like. First power train 22 is connected to vibratory roller 16 and second power train 24 is connect to power roller 18.

Frame 14 includes a platform 26 upon which prime mover 20 is mounted and a housing 28 within which rollers 16, 18 are mounted. Platform 26 is positioned above housing 28 on four vibration isolators 30 (e.g., floor mount isolators), one under each corner of rectangular platform 26. Prime mover 20 is preferably mounted on one side of platform 26 with power trains 22, 24 extending across platform 26 generally parallel to rollers 16, 18 below. Detachable hood 12 covers first and second power trains 22, 24. The vibration isolators 30 under prime mover 20 are preferably softer than those on the opposite side of platform 26 to reduce the vibration on power trains 22, 24 where they connect with vibratory roller 16 and power roller 18 so that the drive and driven components, as more particularly described below, do not disengage.

Housing 28 comprises an open bottom rectangular box with opposing side walls 32, front and back walls 34, 36, respectively, and an interior wall 38 partitioning the housing into a larger compartment 40 within which rollers 16, 18 are mounted and a smaller compartment 42 within which a driven end of rollers 16, 18 makes connection with power trains 22, 24, respectively. Front wall 34 of housing 28 may flare outwardly around vibratory roller 16.

Vibratory roller 16 is suspended in compartment 40 between side wall 32 and interior wall 38. Vibratory roller 16 has a transverse drum 44 rotatably mounted in side wall 32 and interior wall 38 and an unbalanced shaft 46 rotatably driven by first power train 22. As best seen in FIG. 6, drum 44 may be a hollow cylinder capped with end plates 48. End plates 48 have a central hole 50 flanked by first and second concentric recesses 52, 54, respectively. A bearing 56 which may comprise an inner and outer race of rollers is press fit into first recess 52. Unbalanced shaft 46 is journaled in bearing 56. A circular plate 58 with an attached collar 60 is bolted into second recess 54. The back of circular plate 58 holds bearing 56 in first recess 52 and collar 60 serves as the drum axle. Collars 60 may be rotatably mounted in self-aligning, lubricated bushings 62 (i.e., plain bearings) provided in side wall 32 and interior wall 38. Unbalanced shaft 46 extends through interior wall 38 and is, rotatably driven by first power train 22 as more particularly described below.

Unbalanced shaft 46 has an eccentric flyweight 64. In the embodiment shown in FIG. 6, flyweight 64 is attached to shaft 46 with a pair of screws. Opposite ends of shaft 46 include an abutment shoulder 66 against which bearing 56 is seated. To equalize vibratory forces on drum 44, it is preferred that flyweight 64 be divided into first and second, unequal portions, with the heaviest portion being farthest from the prime mover. This compensates for the fact that the weight on platform 26 is greater on the side under prime mover 20.

Power roller 18 is suspended in housing 28 and, like vibratory roller 16, has a transverse drum 68 opposite ends of which are rotatably mounted in side wall 32 and interior wall 38. Power roller has a shaft 70 that extends through interior wall 38 and is rotatably driven by second power train 24. As best seen in FIG. 5, drum 68 may be a hollow cylinder that is divided into right and left sections 68a, 68b, respectively. An outboard end of each section is capped with an end plate 72, while a second plate 74 is spaced inside the inboard end. Second plate 74 is like end plate 72 except of reduced diameter such that it fits within drum 68. At the outboard end, shaft 70 and drum axle are journaled in bearings and bushings in the same manner as unbalanced shaft 46 in vibratory roller 16, details of which are redundant and therefore omitted. On the inboard end of each section, shaft 70 is attached to a differential 76 whereby sections 68a, 68b may roll so that the roller on the inside of a turn rolls slower and, preferably, even backward, while the roller on the outside rolls forward.

In the embodiment shown in FIG. 5, differential 76 includes a hub 78 which is pinned or keyed to shaft 70. Two or more pinions 80 are symmetrically mounted for rotation on radial pinion shafts 82 interconnecting hub 78 with a collar 84. A pair of side gears 86 are mounted on second plates 74 and mesh with pinions 80. Collar 84 with plates 74 form the differential housing. When the resistance on sections 68a, 68b is equal, pinions 80, side gears 86 and shaft 70 all rotate as a unit, with no relative movement, and sections 68a, 68b rotate together. When greensroller 10 is turned, sections 68a, 68b must rotate at different speeds or directions to avoid scuffing the green. To compensate for this difference, pinions 80 must turn on pinion shafts 82 to remain in mesh with side gears 86.

Figure 7:
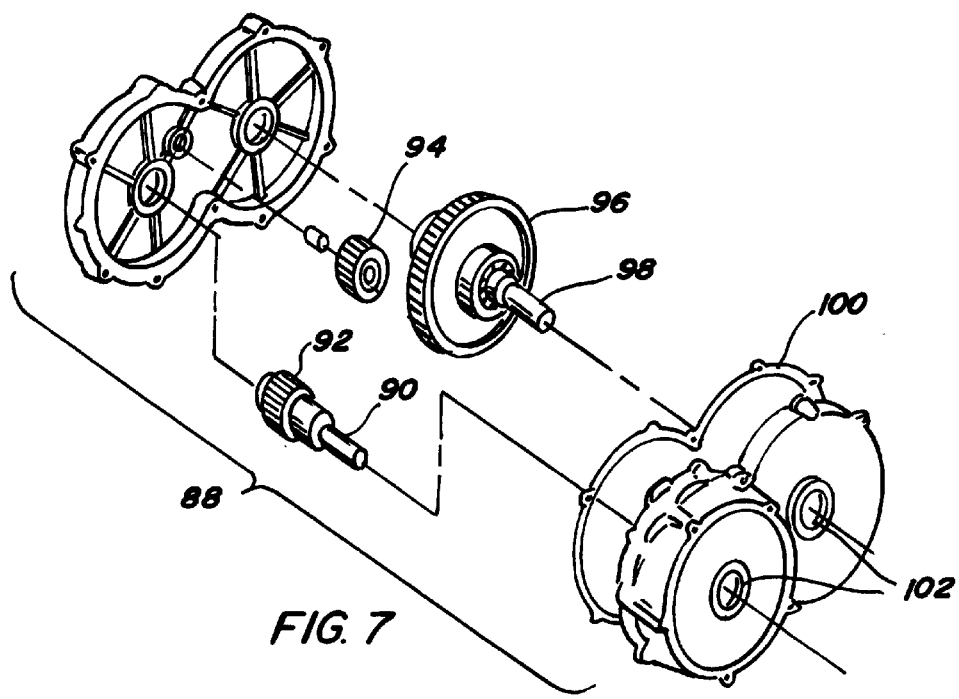
FIG. 7 is an exploded perspective view of a gearbox.

First and second power trains 22, 24 are actuated by prime mover 20 through a gearbox 88 shown in FIG. 7. Prime mover has a horizontal output shaft that is connected within gearbox 88 to a stub shaft 90 having a pinion gear 92. A free end of stub shaft 90 passes through gearbox 88 where it serves as a power take-off for first power train 22. An idler gear 94 in mesh with pinion gear 92 drives a spur gear 96 at a reduced speed (e.g., 2.8:1). Spur gear 96 is mounted for rotation on a stub shaft 98, a free end of which passes through gearbox 88 where it serves as a power take-off for second power train 24. Gearbox 88 is provided with appropriate gaskets (e.g., gasket 100) and oil seals (e.g., oil seal 102).

First and second power trains 22, 24 are supported above platform 26 on a pair of vertical walls 104, 106. Each of walls 104, 106 is stabilized with right-angle leg extensions. Stub shaft 90 from gearbox 88 is connected with a spider three-jaw coupling 108 or the like to a horizontal jack shaft 110. Coupling 108 absorbs shock and vibration and compensates for shaft misalignment. Jack shaft 110 passes through walls 104, 106 and is journaled in a pair of pillow block bearings 112 mounted on walls 104, 106. Jack shaft 110 is connected to a drive pulley 114 through a centrifugal clutch 116 which automatically engages the drive pulley at a preselected speed, e.g., about 2,000 rpm. A driven pulley 118 is attached to unbalanced shaft 46 and drive pulley 114 is attached to driven pulley 118 with a belt 120. Drive pulley 114 is larger than driven pulley 118 such that the driven pulley spins at increased speed.

Second stub shaft 98 is attached to a drive pulley 122 in second power train 24. Drive pulley 122 is connected with a belt 124 to a variable speed pulley 126 mounted on first end of a jack shaft 128 for infinite speed control of power roller 18 preferably between 0 and a trot or brisk walk (e.g., 4.2 mph). Jack shaft 128 passes through walls 104, 106 and is journaled in a pair of pillow block bearings 112 mounted on walls 104, 106. An idler roller 130 is mounted on one end of a lever 132 journaled on jack shaft 128, such that it can be brought in and out of contact with belt 124. A flexible line or Bowden cable 134 is attached to the other end of lever 132 and extends to a speed control assembly 136 located on a handle 138 near the operator. Variable speed pulley 126 has two separate pulley members which are designed to be moved toward and away from one another in response to pressure on belt 124. Belt 124 is adjusted such that it slips on variable speed pulley 126 until tightened with idler roller 130, whereupon variable speed pulley 126 starts to rotate. While belt 124 is slipping, power roller 18 is stationary, even though prime mover 20 may be operating at its optimum rpm (e.g., 2,000 to 3,500 rpm). Drive pulley 122 is smaller than variable speed pulley 126 at its maximum effective diameter (e.g., a ratio 2:5), such that jack shaft 128 is rotated at a slower speed than drive pulley 122. As the pressure on cable 134 is increased, the effective diameter of variable speed pulley 126 decreases and jack shaft 128 is rotated at increasingly faster speeds.

A drive sprocket wheel 140 is attached to a second end of jack shaft 128. A driven sprocket wheel 142 is attached to shaft 70 of power roller 18. Drive sprocket wheel 140 is attached to driven sprocket wheel 142 with a chain drive 144. Chain drive 144 may be kept tight with a spring biased idler 145. Drive sprocket wheel 140 is smaller than driven sprocket wheel 142 such that the driven sprocket wheel 142 spins at decreased speed (e.g., sprocket wheel 140 may have 19 teeth and sprocket wheel 142 may have 32). A chain or cog drive with sprocket wheels 140, 142 provides positive contact to drive power roller 18 even on damp grass, whereas a belt might slip.

Figure 8:
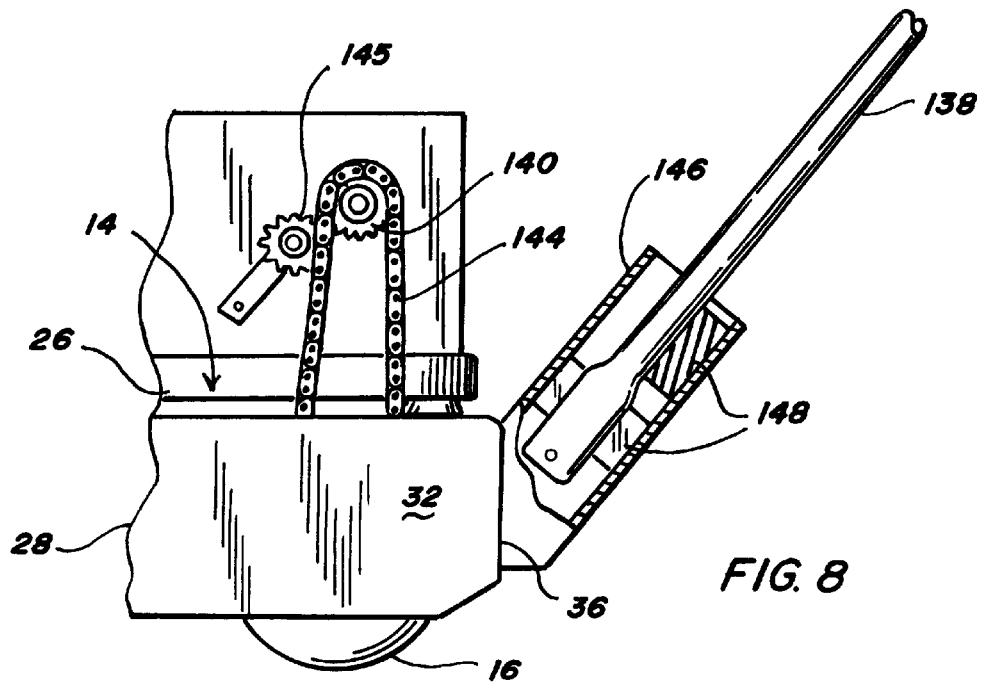
FIG. 8 is a fragmentary side elevational view, with portions partly broken away, of a bracket for attaching a handle to the greensroller.

Greensroller 10, like prior art lawn mowers, has a control handle 138. In a preferred embodiment, as shown in the drawings, the control handle, while adjustable, is in a generally fixed angular relationship with the greensroller in use. As shown in FIG. 8, handle 138 is attached to back wall 36 of housing 28 with a bracket 146 into which the ends of U-shaped handle 138 are received and pinned. Vibrations isolators 148 are provided in bracket 146 to limit the amount of vibration translated from housing 28 to the operator through handle 138. In addition to speed control assembly 136, an engine speed control (not shown) and a dead man power roller control (not shown) may be provided on handle 138 within reach of the operator. When a separate control of the engine speed and of the variable speed pulley is provided, it is possible to selectively engage or disengage vibratory roller 16 by controlling the engine speed with the engine speed control, while having separate, infinite speed control of power roller 18 by varying the speed of the variable speed pulley with speed control assembly 136.

The general operation of greensroller 10 is similar to a walk behind greensmower. The operator makes alternate passes across the green to achieve smoothness, increase ball roll distance and provide a striping effect, all in one use. As greensroller 10 stripes the green, it also removes the grain so that the green need not be mowed as frequently, leading to a healthier turf. Greensroller 10 is designed to respond to operator control just like a walk behind greensmower. After making a pass across the green, the operator can turn the greensroller just like a greensmower. Differential 76 allows for high maneuverability without scuffing the turf or collar of the. green during operation.

By varying the ground speed of the greensroller 10, it: is possible to selectively increase the ball roll distance. For example, when vibrating roller 16 is rotated at about 5,000 rpm, the force on the bottom of drum 44 is calculated to be about 7.5 psi when pressed into turf about 1/32 inch. Tests have shown that by changing the ground speed from 3.5 mph to 2 mph, there will be an increase in the ball roll distance by 18 inches. It will be readily appreciated that the effectiveness of greensroller 10 on the ball roll distance depends on the force applied by the vibrating roller and length of time the force is applied, both of which are, at least in part, under the control of the operator. Other appropriate conditions for effecting improvement in ball roll distance may be determined empirically.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A self-propelled vibratory greensroller for smoothing a green and increasing ball roll distance comprising a vibratory roller and a power roller mounted in a frame, said vibratory roller being parallel to and positioned forwardly of said power roller, said frame supported for movement over the green on the vibratory roller and the power roller, and a prime mover mounted on the frame above the vibratory roller and the power roller, said prime mover having first and second power trains, said vibratory roller having a transversely extending drum rotatably mounted independent of the first powertrain in bearings in the frame and having art unbalanced shaft rotatably driven by the first power train and rotatably mounted in bearings in the drum whereby the unbalanced shaft applies a centrifugal force which vibrates the drum, smoothing the green and increasing ball roll distance, said power roller having a transversely extending drum rotatably mounted in bearings in the frame and divided into right and left sections and having a shaft rotatably driven by the second power train and rotatably mounted in bearings in the drum, said sections being independently rotatable with the shaft through a differential attached to the shaft whereby the sections roll at different speeds or in different directions when the greensroller is turned on the green, minimizing scuffing of the green.

2. The greensroller of claim 1 wherein the first and second power trains are connected to the prime mover through a gearbox, said gearbox having a stub shaft that is connected within the gearbox to an output shaft of the prime mover, said stub shaft having a pinion gear and a free end that passes through the gearbox where it serves as a power take-off for the first power train, an idler gear in mesh with a pinion gear, and a spur gear driven by the idler gear, said spur gear mounted on a stub shaft, a free end of which passes through the gearbox where it serves as a power take-off for the second power train.

3. The greensroller of claim 1 wherein the differential has two more pinion gears in mesh with a pair of side gears, one of which gears is mounted on a plate in an end of each section.

4. The greensroller of claim 1 wherein the second power train has a variable speed pulley for infinite ground speed control of the power roller between about 0 mph and about 4.2 mph.

5. A self-propelled vibratory greensroller for smoothing a green and increasing ball roll distance comprising a vibratory roller and a power roller mounted in a frame, said vibratory roller being parallel to and positioned forwardly of said power roller, said frame supported for movement over the green on the vibratory roller and the power roller, and a prime mover mounted on the frame above the vibratory roller and the power roller, said prime mover having first and second power trains, said vibratory roller having a transversely extending drum rotatably mounted in bearings in the frame and having an unbalanced shaft rotatably driven by the first power train and rotatably mounted in bearings in the drum whereby the unbalanced shaft applies a centrifugal force which vibrates the drum, smoothing the green and increasing ball roll distance, said first power train having a centrifugal clutch for starting to rotate the vibratory roller at a preselected speed, said power roller having a transversely extending drum rotatably mounted in bearings in the frame and divided into right and left sections and having a shaft rotatably driven by the second power train and rotatably mounted in bearings in the drum, said sections being independently rotatable with the shaft through a differential attached to the shaft whereby the sections roll at different speeds or in different directions when the greensroller is turned on the green, minimizing scuffing of the green said second power train having a variable speed pulley for infinite ground speed control of the power roller between about 0 mph and about 4.2 mph.

6. The greensroller of claim 5 wherein the first and second power trains are connected to the prime mover through a gearbox, said gearbox having a stub shaft that is connected within the gearbox to an output shaft of the prime mover, said stub shaft having a pinion gear and a free end that passes through the gearbox where it serves as a power take-off for the first power train, an idler gear in mesh with a pinion gear, and a spur gear driven by the idler gear, said spur gear mounted on a stub shaft, a free end of which passes through the gearbox where it serves as a power take-off for the second power train.

7. The greensroller of claim 6 wherein the second power-take off is connected to a drive pulley, said drive pulley, is connected to the variable speed pulley with a belt which is adjusted to slip on the variable speed pulley, an idler pulley on a lever which can be brought into contact with the belt for increasing pressure on the belt and causing the variable speed pulley to start to rotate, increasing pressure on the belt causing the effective diameter of the variable speed pulley to decrease thereby effecting the infinite ground speed control of the power roller.

8. The greensroller of claim 5 wherein the differential has two more pinion gears in mesh with a pair of side gears, one of which gears is mounted on a plate in an end of each section.

9. The greensroller of claim 5 wherein the frame comprises a platform upon which the prime mover is mounted and a housing within which the vibrating roller and the power roller are rotatably mounted, said platform positioned above the housing on vibration isolators.

10. The greensroller of claim 9 further comprising a handle with a pair of U-shaped legs, a pair of brackets on the housing for receipt of the legs and vibration isolators in the brackets to limit the amount of vibration translated from the housing to the operator through the handle.

* * * * *